(12) United States Patent
Hisakado et al.

(10) Patent No.: US 6,205,095 B1
(45) Date of Patent: Mar. 20, 2001

(54) OPTICAL DISK DEVICE

(75) Inventors: Yuji Hisakado, Daito; Chikashi Inokuchi; Yukihiro Yamasaki, both of Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/210,807

(22) Filed: Dec. 15, 1998

(30) Foreign Application Priority Data

Dec. 15, 1997 (JP) .................................................. 9-343496

(51) Int. Cl.[7] ...................................................... G11B 7/00
(52) U.S. Cl. .................................. 369/50; 369/47; 369/59
(58) Field of Search .................................. 369/47, 48, 49, 369/50, 54, 58, 59; 360/48, 51, 53

(56) References Cited

U.S. PATENT DOCUMENTS 5,278,814 * 1/1994 Deguchi et al. ........................ 369/47
5,815,476 * 9/1998 Inagawa et al. ....................... 369/48
6,069,854 * 5/2000 Koudo et al. .......................... 369/54

* cited by examiner

Primary Examiner—Muhammad Edun
(74) Attorney, Agent, or Firm—Parkhurst & Wendel, L.L.P.

(57) ABSTRACT

A regenerated signal process circuit of an optical disk device is developed to solve the problem that a jitter margin is lowered without an optimum regeneration condition because, when data is regenerated independent of a transfer rate, a data frequency fluctuates against a set value of an AGC, a waveform equalization circuit, a binarization circuit, or the like. In a signal process circuit, a set value of the AGC (104), the waveform equalization circuit (105), the binarization circuit (106), or the like is controlled by referring to the amount of oscillation control current of the VCO (1002) of a frequency synthesizer. The characteristics of the VCO of the data PLL (1001) is set equal to the characteristics of the VCO (1002) of the frequency synthesizer, and each set value is controlled by referring to the oscillation control current of each VCO. Then, the reference current is switched depending on the synchronization state of the data PLL (1001). In addition, the gain of the charge pump (114) is adjusted based on the division ratio of the N divider (111) such that the frequency synthesizer has loop characteristics of constant and stable oscillation.

13 Claims, 12 Drawing Sheets

ОPTICAL DISK DEVICE

TECHNICAL FIELD

The present invention relates to an optical disk device, and more specifically to a regenerated signal process in which a transfer rate can be variable.

BACKGROUND ART

With high-speed regeneration of recent optical disk media such as CD-ROM, DVD, etc., regenerating data in synchronization with data PLL independent of a transfer rate, that is, so-called jitter-free regeneration, is indispensable for improving access speed in the high-speed CAV regeneration (with constant motor revolution) and the CLV regeneration (with constant regeneration speed).

In the jitter-free regeneration, the features in the settings of a filter and an equalizer, the responsiveness of an AGC circuit, the responsiveness of a binary circuit, etc. are variable depending on a transfer rate, and are deteriorated in jitter margin, thereby requiring an operation of varying the setting or responsiveness depending on the transfer rate.

To solve the above described problem, a whole disk is divided into a plurality of zones depending on a data address to vary the settings and the responsiveness for each zone in the conventional CAV regenerating technology, or a transfer rate is computed from the width of a special pattern of binary data to vary the above described settings and the responsiveness depending on the result in the conventional CLV regenerating technology.

With the above described conventional configuration, it is necessary to divide a disk into a number of zones to obtain the optimum settings, thereby largely increasing the number of processes and the management scale. Furthermore, additional circuits such as a circuit for detecting a transfer rate are required. In addition, processes cannot be performed on writable media such as DVD-RAM, etc., especially on an unwritten area.

DISCLOSURE OF THE INVENTION

The optical disk device according to the present invention includes optical means for extracting information stored on a disk, signal process means for optimally converting a regenerated signal extracted by the optical means into a binary signal, and reference clock generation means for generating a reference clock having a transfer speed close to the basic transfer speed of the regenerated signal from a fixed clock. The basic clock generation means is designed to optimally vary the features in the settings of a filter and an equalizer, the responsiveness of an AGC circuit, the responsiveness of a binary circuit, etc. of the signal process means depending on the oscillation frequency of a voltage or current control oscillator built in to generate a reference clock.

Thus, the present invention guarantees the optimum signal process characteristics and the stable loop characteristics of the clock oscillation circuit depending on the oscillation frequency of a reference clock.

Furthermore, the present invention realizes the optimum signal process characteristics depending on a current transfer rate even if it is a variable transfer rate, so that more stable data can be regenerated.

BEST MODE FOR CARRYING OUT THE INVENTION (First Embodiment)

Figure 1:
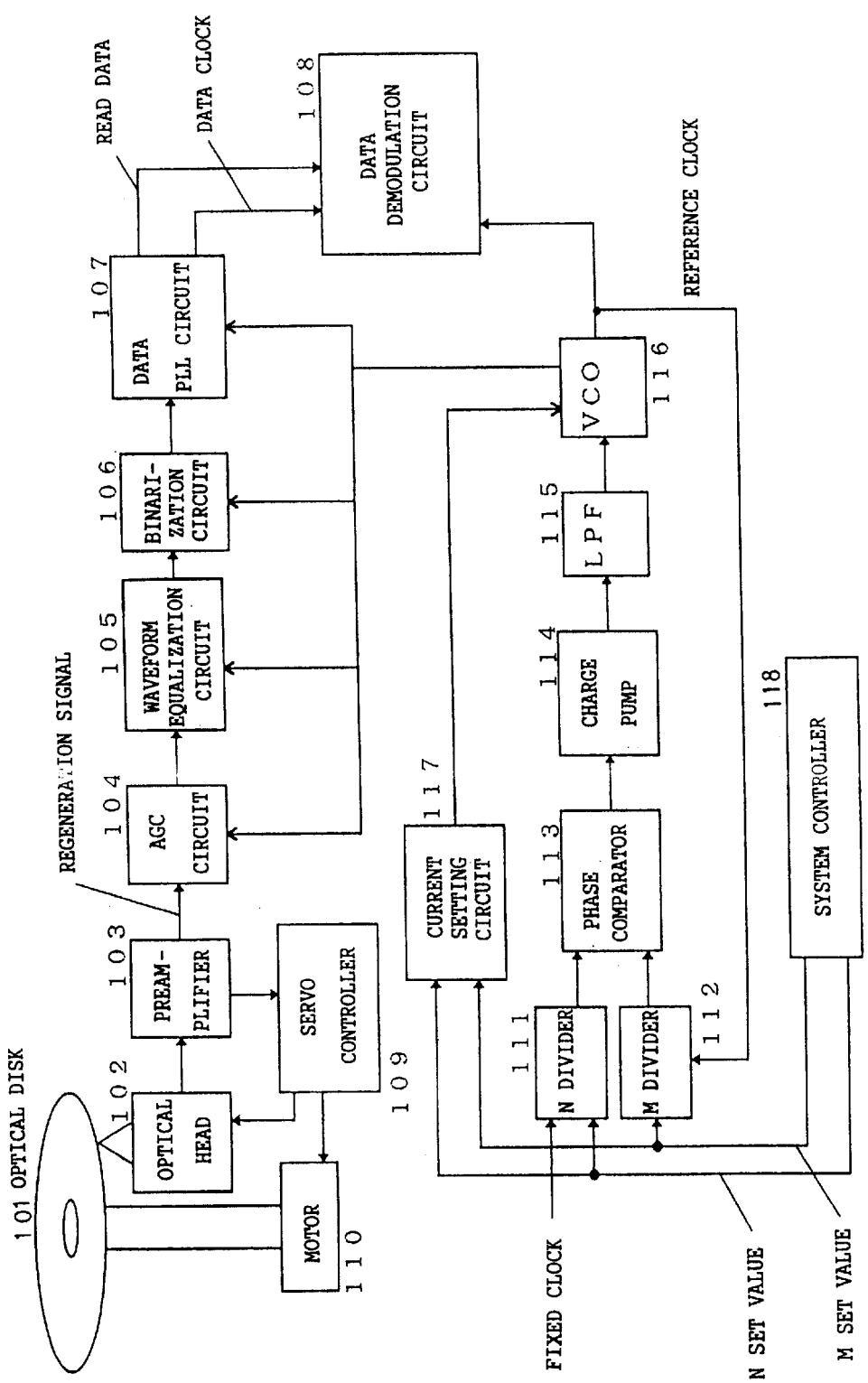
FIG. 1 is a block diagram of an optical disk device according to a first embodiment of the present invention.

FIG. 1 is a block diagram showing the configuration of the signal process of the optical disk device according to the first embodiment of the present invention.

In FIG. 1, 101 is an optical disk; 102 is an optical head for detecting a return light from the optical disk 101 and converting it into an electric signal; 103 is a preamplifier for generating a regenerated signal by, for example, adding an electric signal of the optical head 102; 104 is an AGC circuit for absorbing the fluctuation of the amplitude of a regenerated signal and maintaining a constant amplitude; 105 is a waveform equalization circuit for removing the element out of the signal band and the code interference of a signal; 106 is a binarization circuit for converting a waveform equalized regenerated signal into a binarized digital signal; 107 is a data PLL circuit for extracting clock elements from the binarized regenerated signal, synchronizing them, and generating read data and a data clock; 108 is a data demodulation circuit for demodulating data from the read data and the data clock synchronized by the data PLL circuit 107; and 109 is a servo controller for controlling the optical head 102 and a motor 110.

111 is an N divider for dividing a fixed clock; 113 is a phase comparator for detecting the phase error between the N divider 111 and an M divider 112; 114 is a charge pump for outputting the current depending on the phase error detected by the phase comparator 113; 115 is a low pass filter (LPF) for smoothing the output current from the charge pump 114 and converting the current into a voltage; 116 is a voltage control oscillator (VCO) for oscillation at a frequency depending on the output voltage from the LPF 115; 117 is a current setting circuit for setting an electric current depending on an N set value and an M set value; 112 is an M divider for dividing the reference clock output by the VCO 116; and 118 is a system controller for controlling the entire device.

The N divider 111, the phase comparator 113, the charge pump 114, the LPF 115, the VCO 116, the M divider 112, and the current setting circuit 117 form a frequency synthesizer, and determine the oscillation frequency (reference clock) of the VCO 116 by changing the division ratio of the N divider 111 and the M divider 112.

The division ratio of the N divider 111 and the M divider 112 is normally determined such that the reference clock oscillates at a frequency close to the transfer rate of the regenerated signal. Each circuit can be operated at the optimum settings close to the transfer rate by the AGC circuit 104, the waveform equalization circuit 105, the binarization circuit 106, and the data PLL circuit 107 referring to the oscillation frequency.

Figure 2:
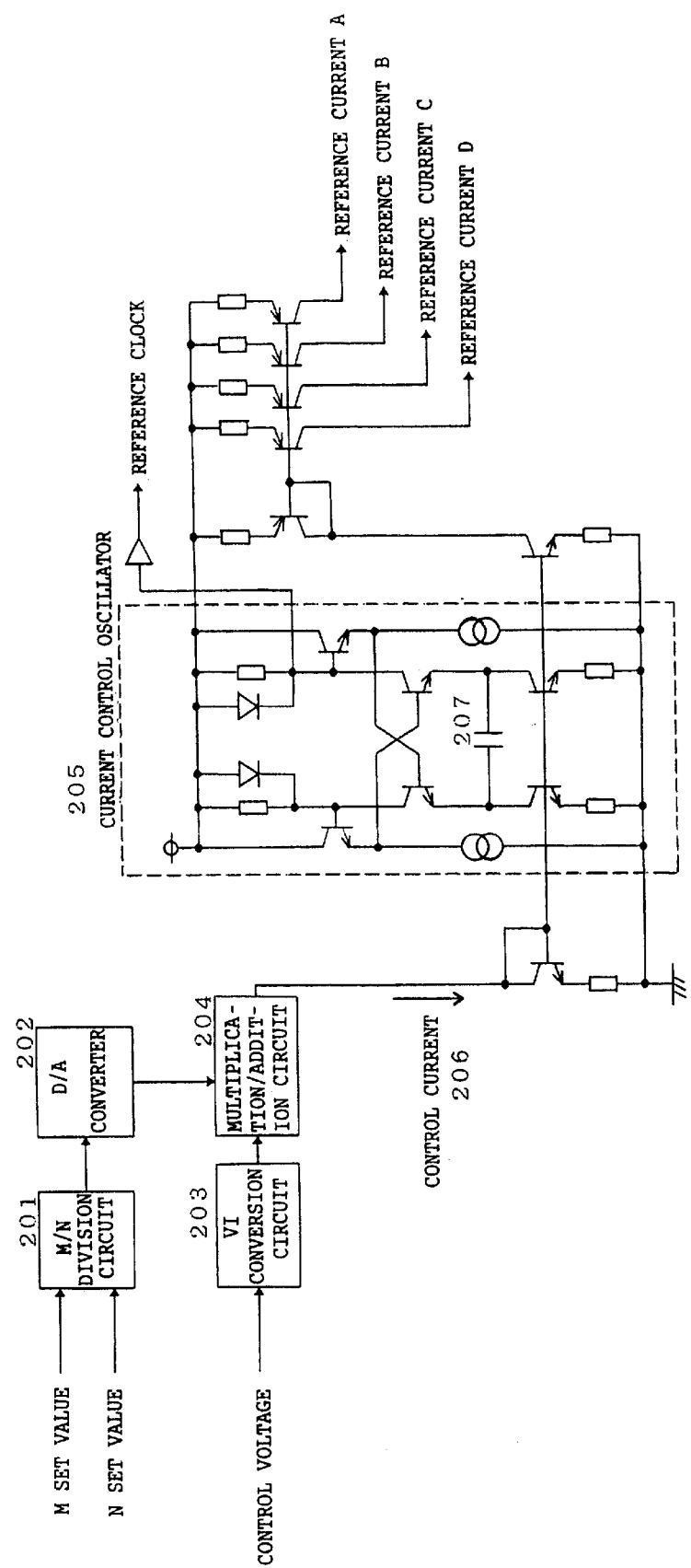
FIG. 2 is a block diagram of the configuration of the VCO of the frequency synthesizer according to the first embodiment of the present invention.

FIG. 2 shows an example of the configuration of the VCO 116 of the frequency synthesizer. The output voltage from the LPF 115 equals the control voltage of the voltage control oscillator 116.

Described below in detail is the configuration and operation of the circuit.

The M set value and the N set value determine the oscillation frequency of a current control oscillator 205. They are controlled by, for example, a 7-bit digital value, and the operation is performed with the loop set at the oscillation frequency f0 computed as follows.

$$f0 = (M/N) \cdot f1$$

where f1 indicates the frequency of the fixed clock.

Figure 3:
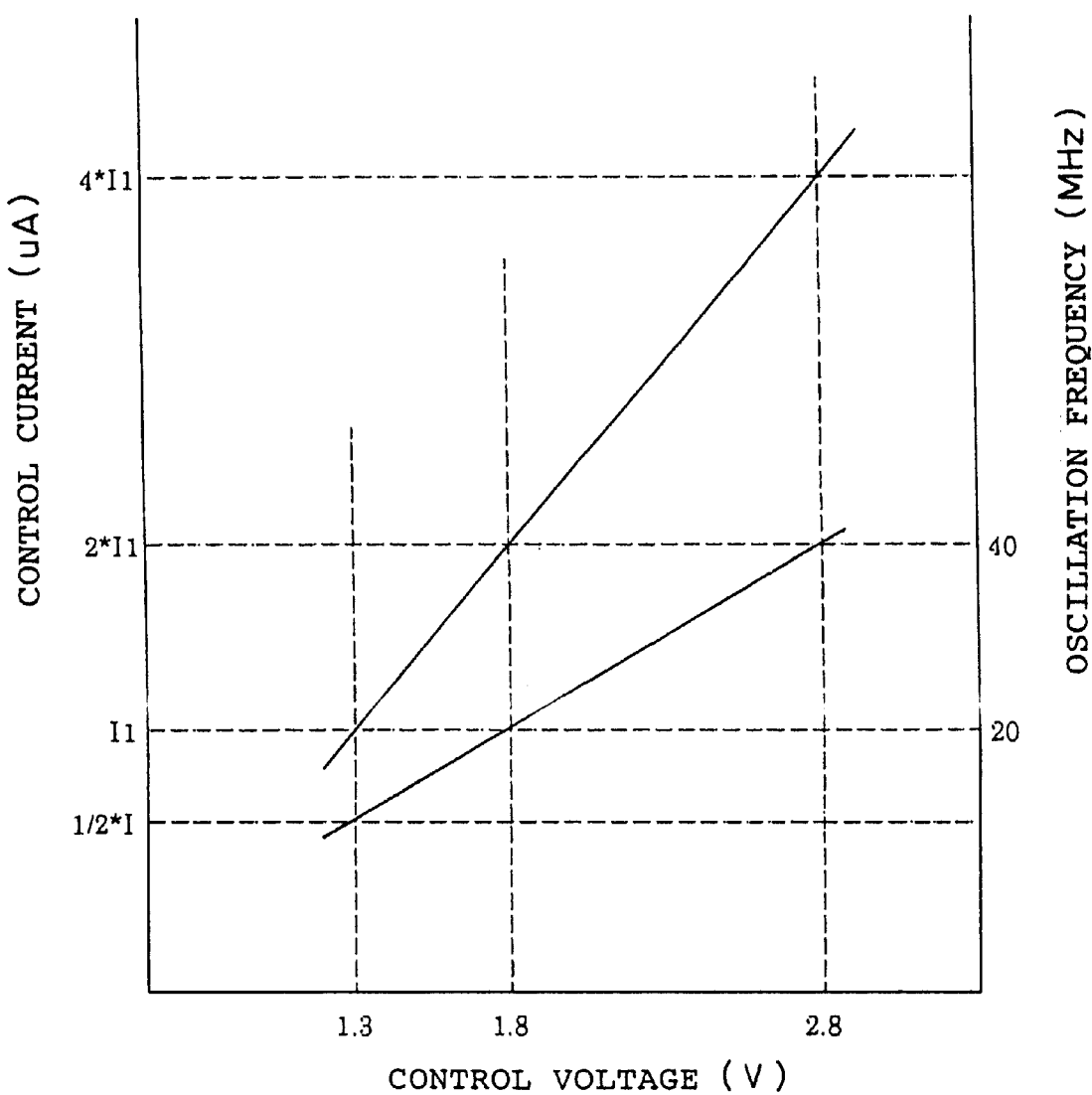
FIG. 3 shows the current-to-frequency characteristics of the VCO of the frequency synthesizer according to the first embodiment of the present invention.

That is, since the frequency changes at the ratio of M to N, an operation result obtained by an M/N division circuit 201 is converted into an electric current by a D/A converter 202. Furthermore, the control voltage is converted into a current value by a VI conversion circuit 203. By a multiplication/addition circuit 204 multiplying the current depending on the M/N value by the current converted from the control voltage and adding the obtained product, a control current 206 to the control voltage or the conversion ratio of the oscillation frequency can be controlled such that the oscillation frequency can be constantly maintained at a mean value of the control voltage, for example, 1.8 V, as shown in FIG. 3. FIG. 3 shows the control current to the control voltage, and the oscillation frequency to the control voltage. FIG. 3 also shows the feature obtained when oscillation is performed at, for example, 20 MHz and 40 MHz.

The control current 206 is current-mirrored, and becomes the control current of the current control oscillator 205. The current control oscillator 205 is basically a multivibrator. The oscillation frequency is determined by the electric current passing through a capacitor 207 and its capacitance, and is oscillated at the frequency computed as follows.

$$f0 = I/(4 \cdot C \cdot VBE)$$

where I indicates the control current 206; f0 indicates the oscillation frequency; C indicates the capacitance of the capacitor 207, and VBE indicates the base emitter voltage of a transistor. The oscillation frequency (f0) is proportional to the control current (I) 206.

That is, since the current value of the control current 206 depends on the oscillation frequency, the electric current is further mirrored and transmitted to the AGC circuit 104, the waveform equalization circuit 105, the binarization circuit 106, and the data PLL circuit 107 (reference current A, B, C, and D). Thus, each circuit is allowed to refer to the information about the oscillation frequency.

If the division ratio of the N divider 111 is altered with the set value of N changed, then the frequency of the comparison by the phase comparator 113 increases, and the output gain of the charge pump 114 changes, thereby changing the loop gain. Therefore, if the current value of the charge pump 114 is changed in proportion to the settings of division of the N divider 111, the loop gain can be constant regardless of the set value, and the synthesizer can be stably PLL-controlled.

Figure 4:
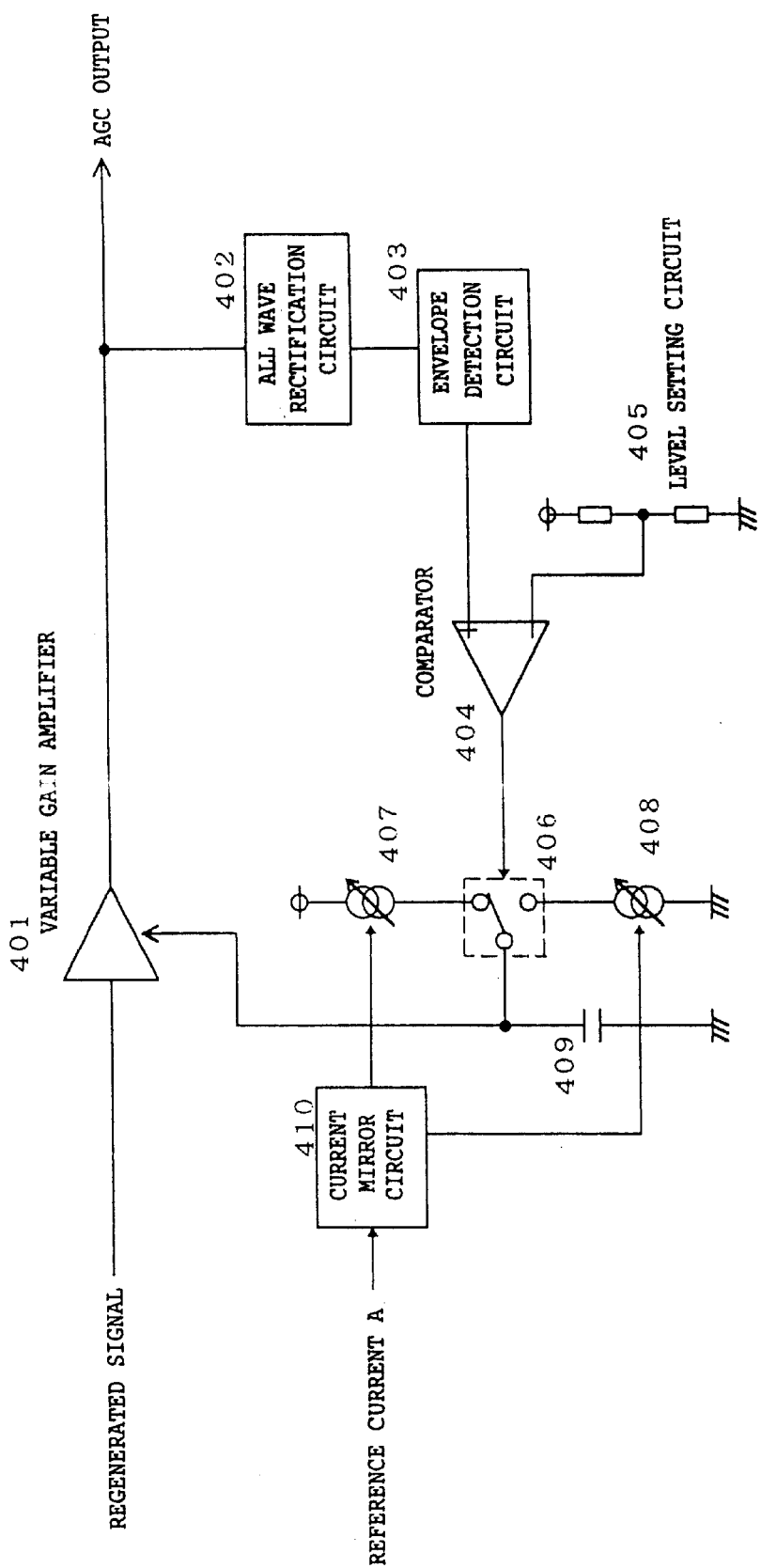
FIG. 4 is a block diagram of the AGC circuit according to the first embodiment of the present invention.

FIG. 4 shows an example of the configuration of the AGC circuit 104. In FIG. 4, 401 is a variable gain amplifier whose gain changes with the value of a control voltage 411; 402 is an all wave rectification circuit for rectifying an output signal of the variable gain amplifier 401; 403 is an envelope detection circuit for detecting an envelope of a rectified signal; 404 is a comparator; 405 is a level setting circuit for setting a slice level of the comparator 404; 406 is an analog switch; 407 and 408 are current sources; 409 is a charge capacitor for generating the control voltage 411; and 410 is a current mirror circuit for mirroring the electric current of the reference current A.

Described below is the operation of the AGC circuit shown in FIG. 4.

The amplitude of a regenerated signal is detected by rectifying the output from the variable gain amplifier 401 by the all wave rectification circuit 402, and detecting it by the envelope detection circuit 403. Furthermore, the size of the amplitude of the regenerated signal compared with a predetermined amplitude can be determined by the comparator 404 comparing the output with the amplitude level set by the level setting circuit 405. When the amplitude of the regenerated signal is larger, the output from the comparator 404 indicates a high level, the current source 408 is selected by the switch 406, the control voltage 411 is lowered by retrieving the electric current from the charge capacitor 409, and the operation is performed to lower the gain of the variable gain amplifier 401. If the amplitude of the regenerated signal is smaller, then an electric current is provided in the opposite direction, that is, from the current source 407 to the charge capacitor 409, the control voltage 411 is raised, and the gain of the variable gain amplifier 401 is raised.

Depending on the amount of an electric current of the reference current A, the electric current of the current sources 407 and 408 is changed. Since the reference current A is proportional to the oscillation frequency of the VCO 116 of the frequency synthesizer, the electric current increases when the oscillation frequency is high, and the charge/discharge time of the charge capacitor 409 is shortened, thereby improving the response of the AGC circuit. When the oscillation frequency is low, the opposite result is obtained. That is, the response of the AGC can be controlled depending on the oscillation frequency.

Figure 5:
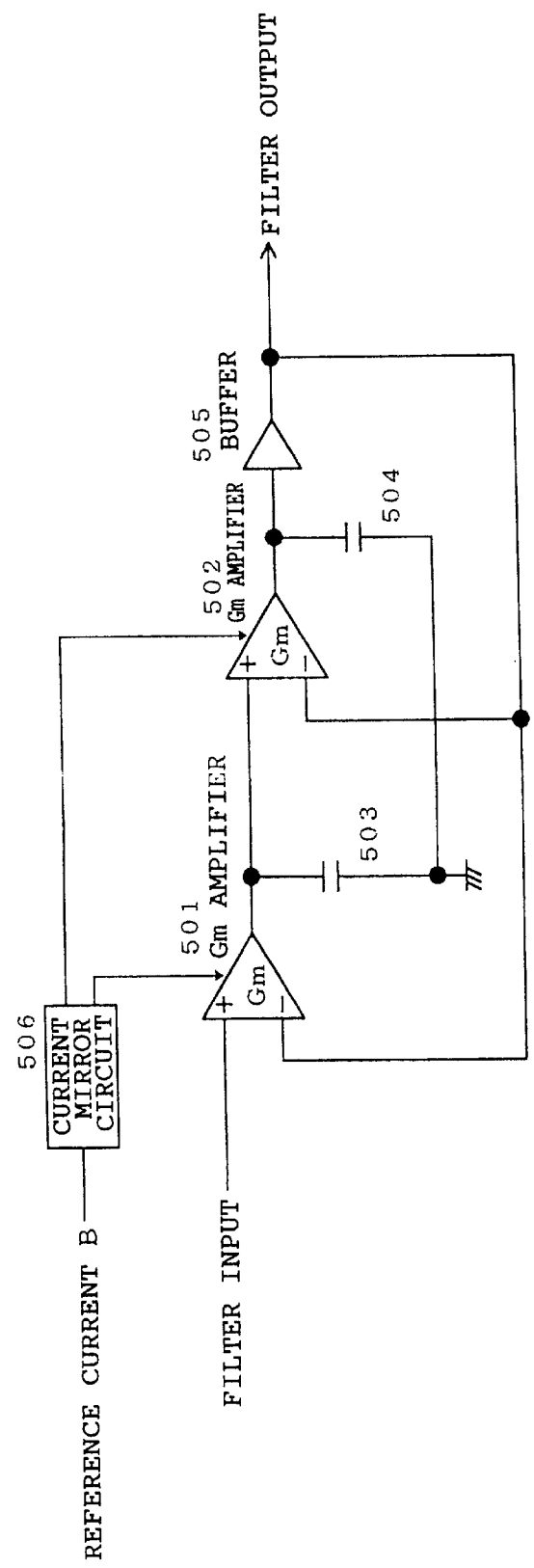
FIG. 5 is a block diagram of the waveform equalization circuit according to the first embodiment of the present invention.

FIG. 5 shows the configuration of the waveform equalization circuit 105.

For simplicity, the circuit indicates a secondary low pass filter. It is designed to have an RC filter using transconductance amplifiers (gm amplifiers) 501 and 502, and capacitors 503 and 504 so that a cut-off frequency can be changed; an output buffer 505; and a current mirror circuit 506 for mirroring a reference current B. Since the conductance of the gm amplifiers 501 and 502 changes with a current value, the cut-off frequency becomes high when the current value becomes large. Therefore, the filter is the one of a waveform equalization circuit having the cut-off frequency proportional to the oscillation frequency of the VCO 116 of the frequency synthesizer by mirroring the reference current B to be used as a control current for the gm amplifiers 501 and 502.

When the order of the filter is higher, a filter comprising the gm amplifier and the capacitor with an operational amplifier added and connected as a depending unit can have the above described effect.

Figure 6:
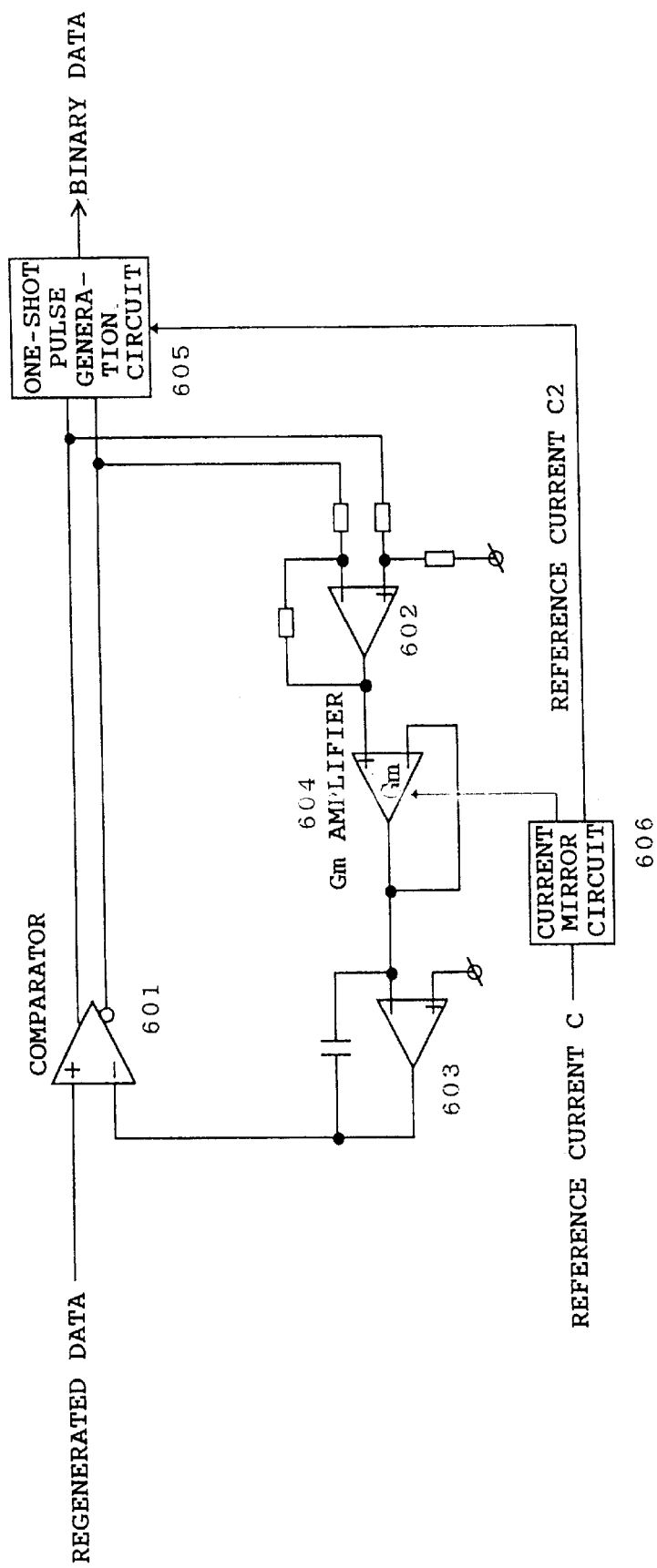
FIG. 6 is a block diagram of the binarization circuit according to the first embodiment of the present invention.

FIG. 6 shows an example of the circuit of the binarization circuit 106.

As shown in FIG. 6, the binarization circuit comprises a comparator 601 for binarizing a regenerated signal; a differential amplifier 602 for controlling the slice level based on the output result from the comparator 601; an integrator 603, and a gm amplifier 604 for determining a time constant for integration. Since the conductance of the gm amplifier 604 changes with an electric current, its control current is used after being mirrored by a current mirror circuit 606 for mirroring a reference current C of the VCO 116. As a result, when the oscillation frequency of the VCO 116 is high, that is, when the transfer rate of a regenerated signal is high, the conductance is large, and the electric current entering the capacitor of the integrator 603 is large, thereby quickening the response of the system. When the transfer rate is low, the opposite result is obtained. That is, the optimum binary response can be realized depending on the transfer rate.

Figure 7:
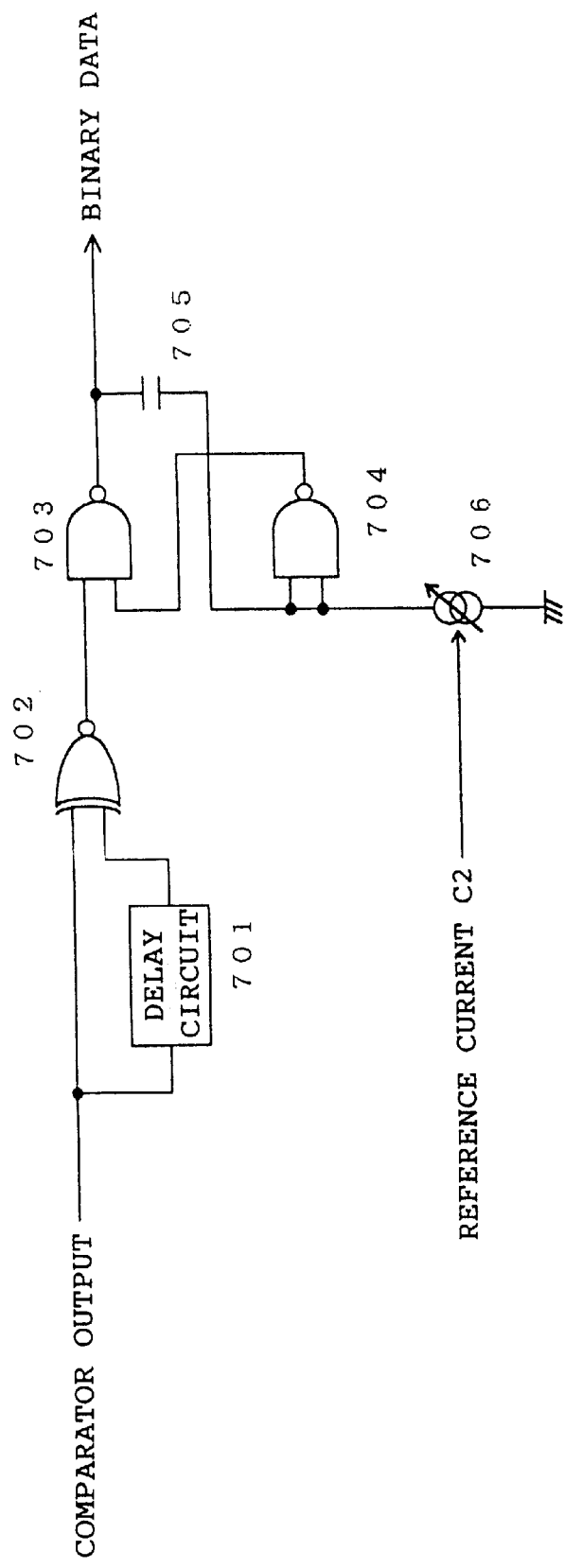
FIG. 7 is a block diagram of the one-shot pulse generation circuit according to the first embodiment of the present invention.

A one-shot pulse generation circuit 605 converts a binarized signal of the PWM obtained by the comparator 601 into a one-shot pulse having the pulse width depending on the transfer rate. FIG. 7 shows an example of the configuration.

In FIG. 7, 701 is a delay circuit for delaying a comparator output; 702 is an EX-NOR circuit; 703 and 704 are NAND circuits; 705 is a capacitor; 706 is a current source whose current value changes in proportion to the amount of an electric current of the reference current C.

Since the output of the comparator 601 carries information both at rise and fall times, this circuit is a mono-multi vibrator which outputs a pulse having a constant width for both times.

The pulse width is determined by a capacitance of the capacitor 705 and a current value of the current source 706. The larger that current value is, that is, the higher the oscillation frequency of the VCO 116 of the frequency synthesizer is, the smaller the pulse width becomes. Thus, the pulse, which depends on the transfer rate, is output to the data PLL circuit 107 as binary data, and generates read data which is output from the data PLL circuit 107. As a result, the binary data is prevented from being mis-detected by a data clock.

Figure 8:
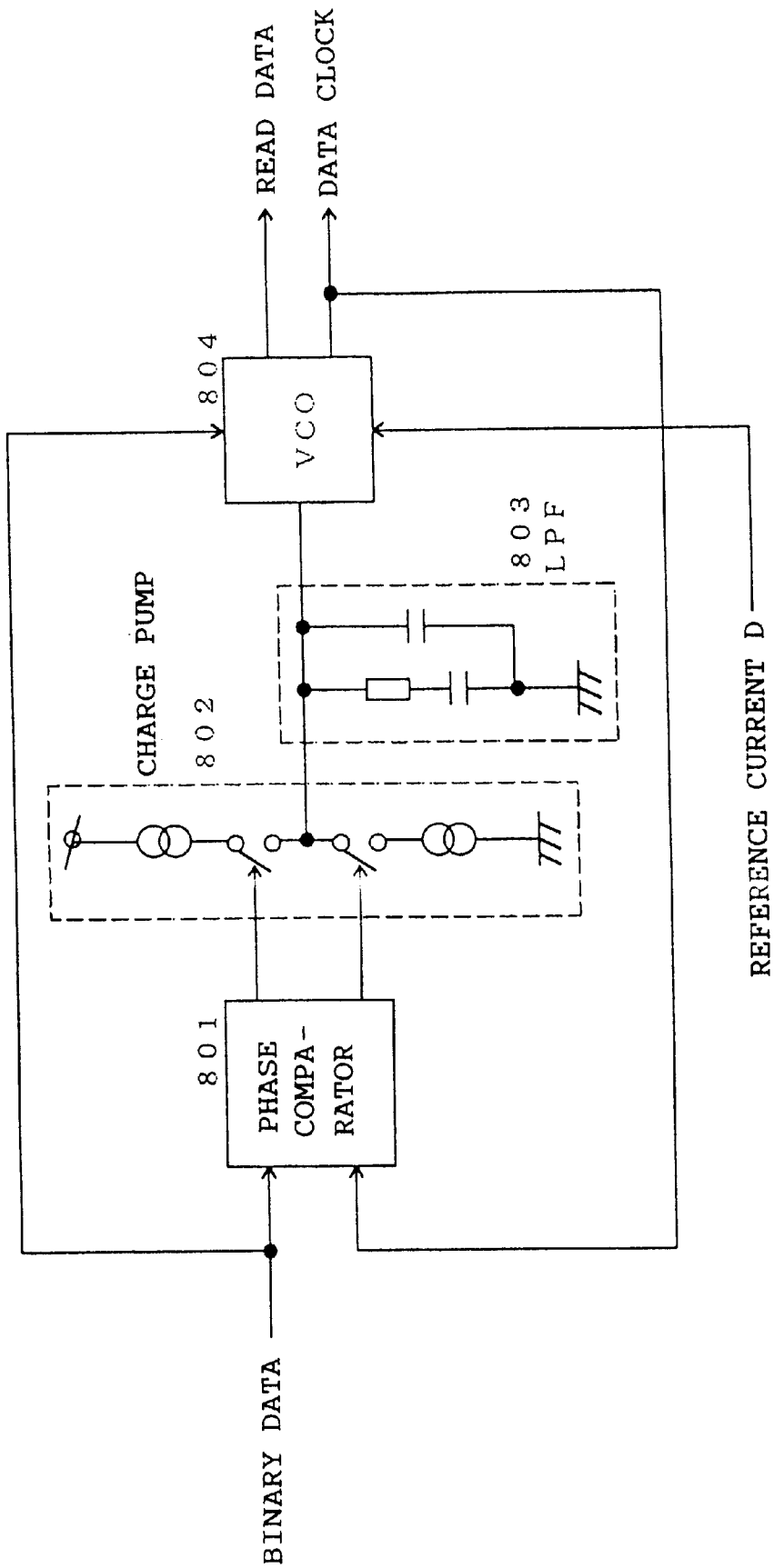
FIG. 8 shows the circuit configuration of the data PLL according to the first embodiment of the present invention.

FIG. 8 shows the configuration of the data PLL circuit 107.

In FIG. 8, 801 is a phase comparator for detecting a phase difference between binary data and a data clock; 802 is a charge pump for charging and discharging an electric current depending on an output result of the phase comparator 801; 803 is a low pass filter for converting and smoothing a voltage depending on the amount of an electric current of the charge pump; and 804 is a VCO for oscillating an oscillation frequency depending on the voltage generated in the low pass filter. The data PLL circuit shown in FIG. 8 is designed to convert the central oscillation frequency and the gain of the VCO 804 using a reference current D from the VCO 116 of the frequency synthesizer.

Figure 9:
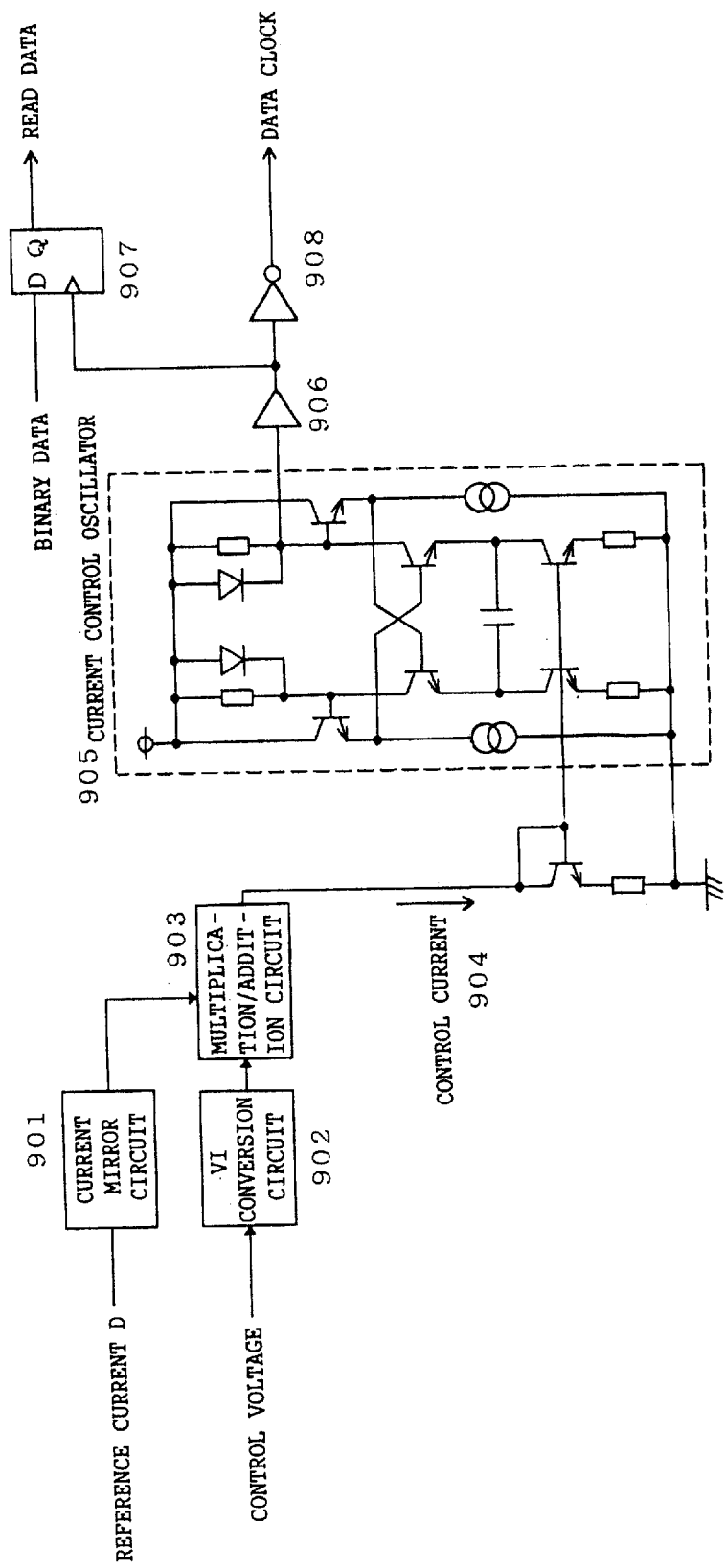
FIG. 9 is a block diagram of the VCO circuit of the data PLL according to the first embodiment of the present invention.

FIG. 9 shows the configuration of the VCO circuit 804 of the data PLL circuit.

901 is a current mirror circuit for mirroring a reference current D from a frequency synthesizer; 902 is a VI conversion circuit for converting the control voltage of the VCO into an electric current; 903 is a multiplication/addition circuit for computing the central frequency from the reference current D depending on the oscillation frequency of a synthesizer, performing an operation such that the current-oscillation frequency conversion gain can be equal to that of the synthesizer, and outputting the result as a control current (904) of a current control oscillator 905; 906 is a buffer; 907 is a flipflop for synchronizing the binary data using the data clock and generating read data; and 908 is an inverse buffer. The circuit and the feature of the current control oscillator 905 are equivalent to those of the synthesizer.

Thus, by obtaining the characteristics similar to those of the synthesizer and referring to the oscillation current, the data PLL can also output oscillation at a frequency half to twice as high as the central oscillation frequency. As a result, the rate difference between the innermost circumference and the outermost circumference is about 2.6 times in the CAV regeneration of the DVD-ROM which is one of the current optical disk media. Actually, the oscillation covering the entire range of the CAV regeneration can also be realized. Furthermore, the oscillation can be realized in the CAV regeneration at a double revolution by doubling the oscillation frequency of the synthesizer.

(Second embodiment)

Figure 10:
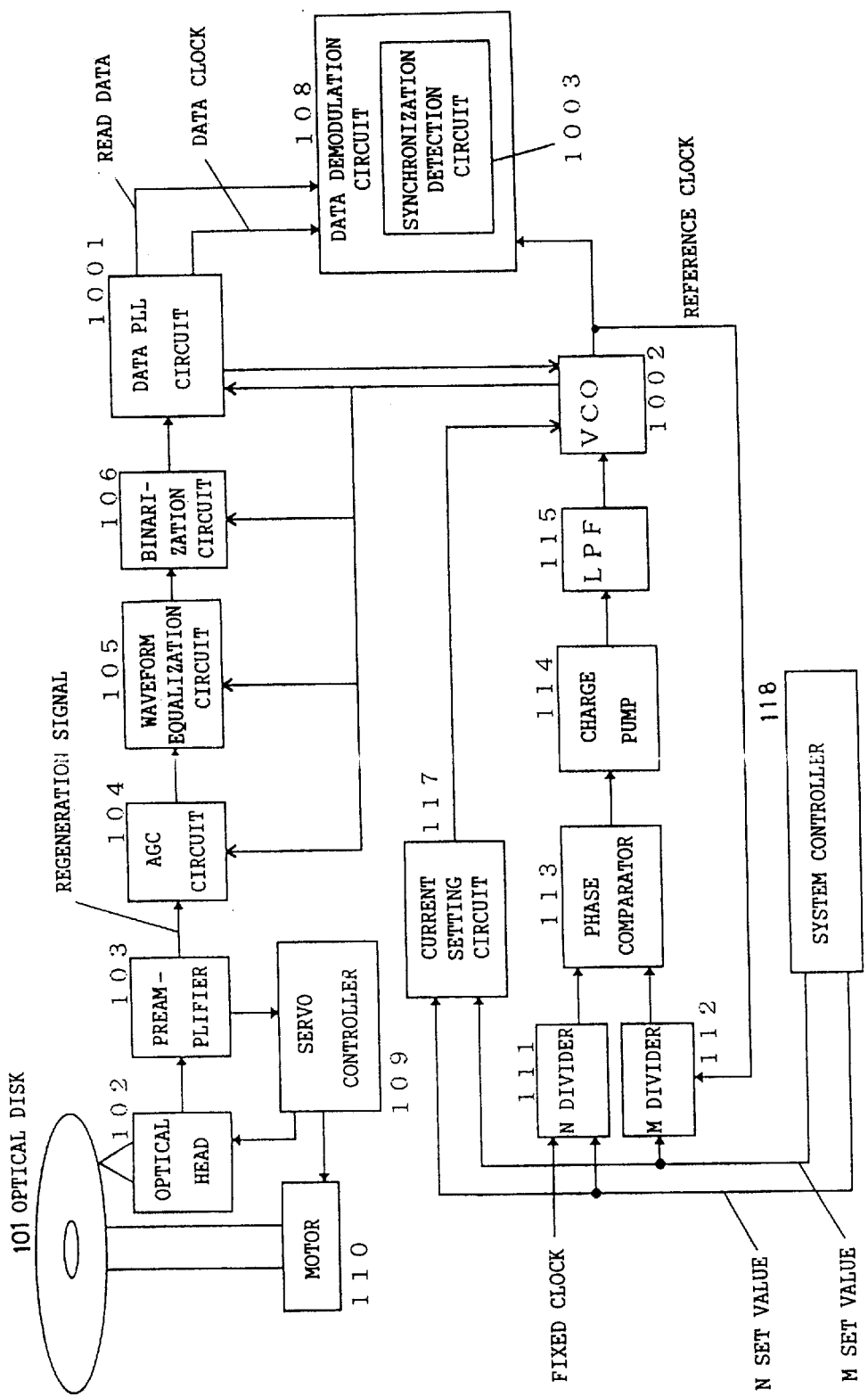
FIG. 10 is a block diagram of the optical disk device according to a second embodiment of the present invention.

FIG. 10 shows an optical disk device according to the second embodiment of the present invention.

In FIG. 10, 101 is an optical disk; 102 is an optical head for detecting a return light from the optical disk 101 and converting it into an electric signal; 103 is a preamplifier for generating a regenerated signal by, for example, adding an electric signal of the optical head 102; 104 is an AGC circuit for absorbing the fluctuation of the amplitude of a regenerated signal and maintaining a constant amplitude; 105 is a waveform equalization circuit for removing the element out of the signal band and the code interference of a signal; 106 is a binarization circuit for converting a waveform equalized regenerated signal into a binarized digital signal; 1001 is a data PLL circuit for extracting clock elements from the binarized regenerated signal, synchronizing them, and generating read data and a data clock; 108 is a data demodulation circuit for demodulating data from the read data and the data clock synchronized by the data PLL circuit 1001; and 109 is a servo controller for controlling the optical head 102 and a motor 110.

111 is an N divider for dividing a fixed clock; 113 is a phase comparator for detecting the phase error between the N divider 111 and an M divider 112; 114 is a charge pump for outputting the current depending on the phase error detected by the phase comparator 113; 115 is a low pass filter (LPF) for smoothing the output current from the charge pump 114 and converting the current into a voltage; 1002 is a voltage control oscillator (VCO) for oscillation at a frequency depending on the output voltage from the LPF 115; 117 is a current setting circuit for setting an electric current depending on an N set value and an M set value; 112 is an M divider for dividing the reference clock output by the VCO 1002; and 118 is a system controller for controlling the entire device.

The N divider 111, the phase comparator 113, the charge pump 114, the LPF 115, the VCO 1002, the M divider 112, and the current setting circuit 117 form a frequency synthesizer, and determine the oscillation frequency (reference clock) of the VCO 1002 by changing the division ratio of the N divider 111 and the M divider 112. In addition, 1003 is a data synchronization detection circuit for detecting a synchronization state between the data clock and read data output by the data PLL circuit 1001.

The data synchronization detection circuit 1003 determines whether or not the data PLL circuit 1001 is synchronized based on, for example, the detection ratio of the SYNC mark for demodulation synchronization of the data contained in the read data. It can be also designed such that it is determined that the data PLL circuit 1001 is synchronized when a predetermined number of the SYNC marks can be continuously detected, and that it is not synchronized when a predetermined number of them cannot be continuously detected.

Since the AGC circuit 104, the waveform equalization circuit 105, and the binarization circuit 106 are the same as those according to the first embodiment of the present invention, the detailed explanation about them is omitted here.

Figure 11:
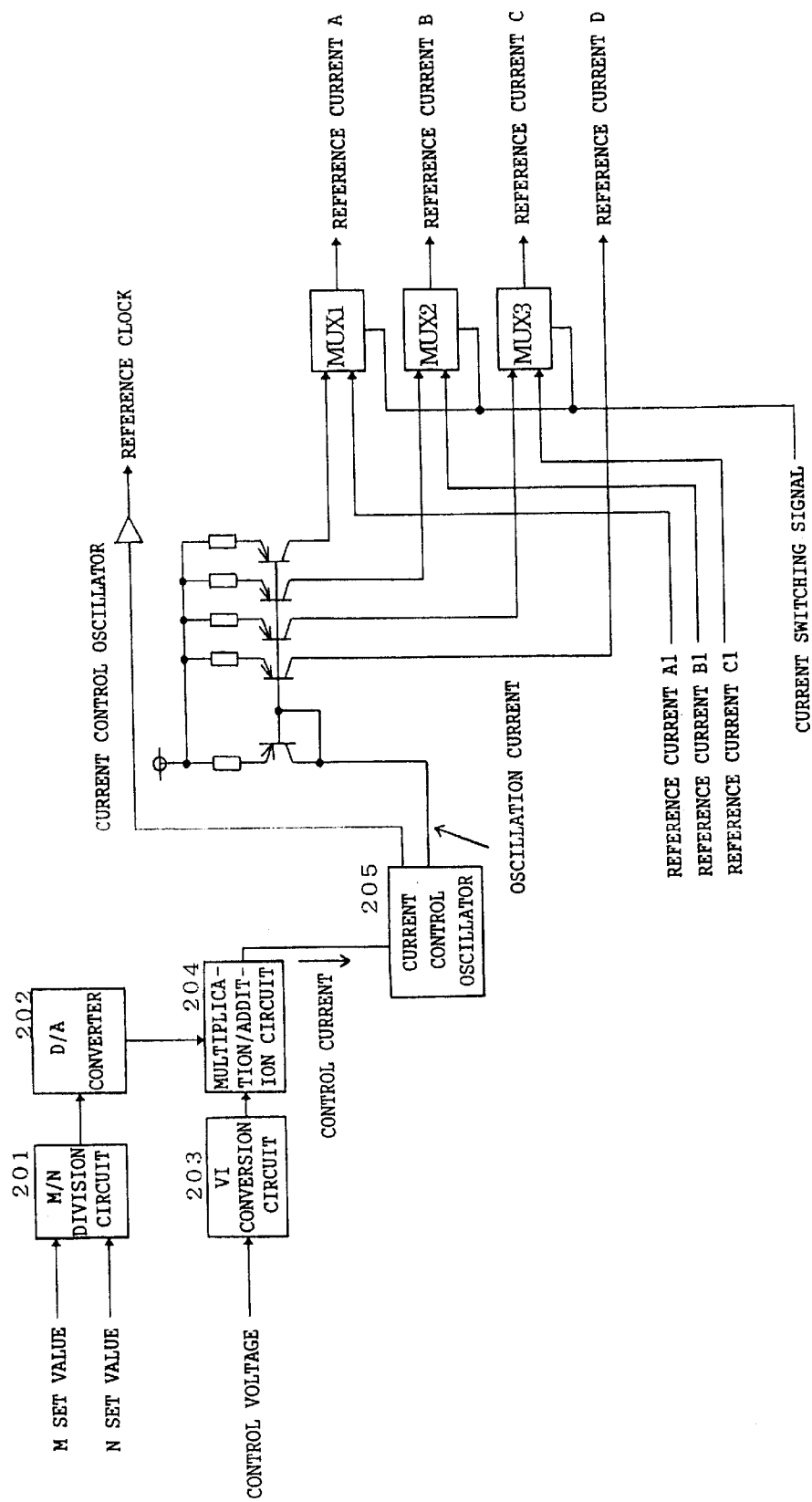
FIG. 11 is a block diagram of the configuration of the VCO of the frequency synthesizer according to the second embodiment of the present invention.

FIG. 11 is a block diagram showing the configuration of the VCO 1002 of the frequency synthesizer. The M/N division circuit 201, the D/A converter 202, the VI conversion circuit 203, the multiplication/addition circuit 204, and the current control oscillator 205 are the same as those shown in FIG. 2.

MUX1, MUX2, and MUX3 are analog multiplexers for switching the selection sources of the reference currents A, B, and C respectively. The reference currents A, B, and C are respectively provided for the AGC circuit 104, the waveform equalization circuit 105, and the binarization circuit 106. Switching the MUX1, MUX2, and MUX3 is performed according to the control signal (current switching signal) from the data synchronization detection circuit 1003. When it is determined that the data synchronization detection circuit 1003 is synchronized, the reference currents A1, B1, and C1 are selected. In addition, the reference currents A1, B1, and C1 are provided by the data PLL circuit 1001 described later.

The data synchronization detection circuit 1003 determines whether or not the data PLL circuit 1001 is synchronized based on, for example, the detection ratio of the SYNC mark for demodulation synchronization of the data contained in the read data. It can also be designed such that it is determined that the data PLL circuit 1001 is synchronized when a predetermined number of the SYNC marks can be continuously detected, and that it is not synchronized when a predetermined number of them cannot be continuously detected. For a disk in which an unrecorded area exists such as a RAM medium, the synchronization can be determined by the detection of an address mark.

Figure 12:
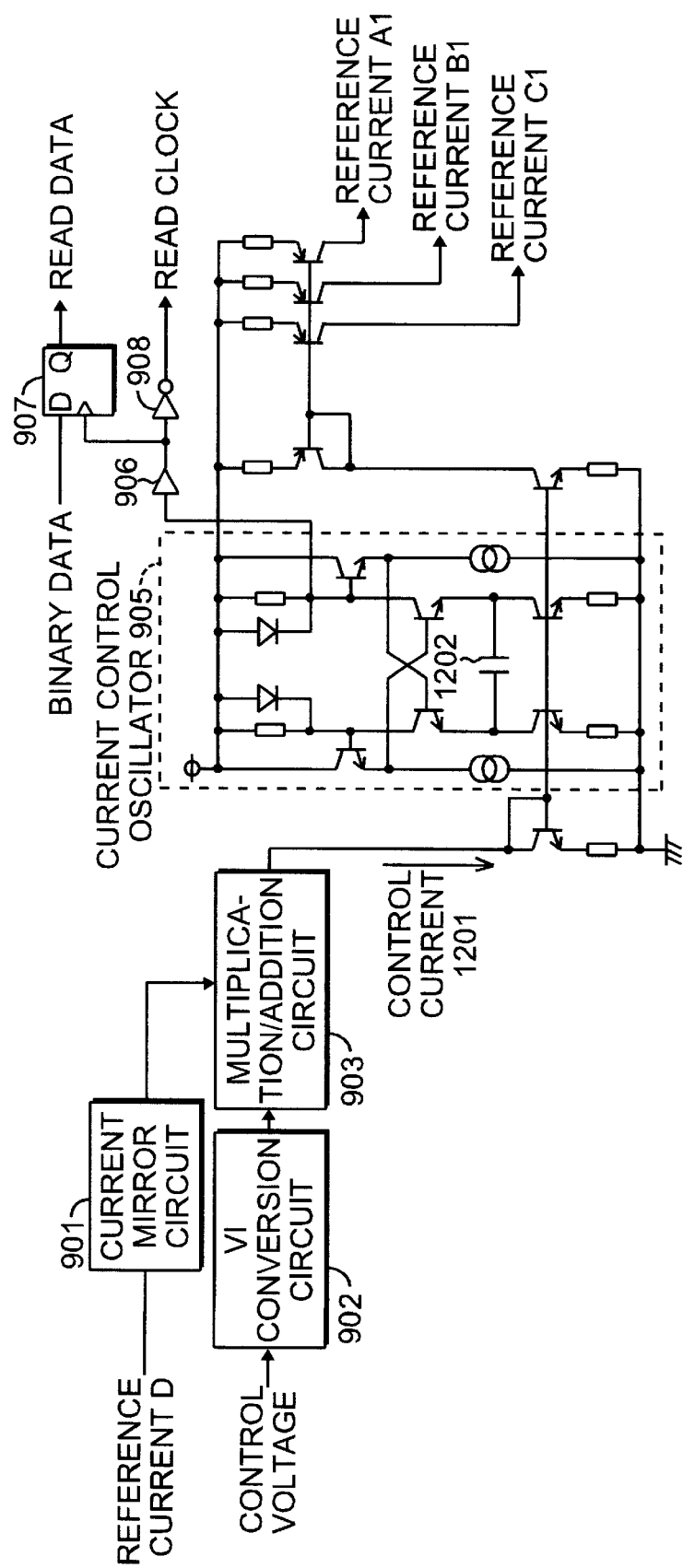
FIG. 12 is a block diagram of the VCO circuit of the data PLL according to the second embodiment of the present invention.

FIG. 12 shows the configuration of the VCO of the data PLL circuit 1001.

The basic configuration is the same as that shown in FIG. 9, and the basic description is omitted here. The oscillation frequency of the VCO is determined by the electric current of a control current 1201 and the capacitance of a capacitor 1202, and an electric current (reference currents A1, B1, and C1) can be generated according to the frequency of the read data by mirroring the control current 1201. That is, the reference current can be generated corresponding to the transfer rate of regenerated data.

However, the reference currents A1, B1, and C1 generated by the data PLL can only be referred to when the data PLL is synchronized. Therefore, they are switched into the reference current of the synthesizer depending on the synchronization state as described above. Thus, the optimum gain control, waveform equalization, and binarization can be performed based on the data transfer rate, thereby successfully regenerating stable data.

What is claimed is:
1. An optical disk device comprising:
 optical means for extracting information stored on a disk;
 control means for controlling said optical means;
 signal process means for optimally converting a regenerated signal extracted by said optical means into a binary signal; and
 reference clock generation means for generating a reference clock substantially equal to a basic transfer speed of the regenerated signal from a fixed clock;
 said reference clock generation means comprising:
  a first divider for dividing the fixed clock;
  a second divider for dividing the reference clock;
  a phase comparator for detecting a phase error between a division clock output by said first divider and a division clock output by said second divider;
  a voltage/current control oscillator for oscillation at a frequency depending on the phase error output by said phase comparator; and
  setting means for setting a central oscillation frequency or a gain of said voltage/current control oscillator;
 whereby characteristics of said signal process means are optimally varied according to an oscillation frequency of said voltage/current control oscillator.

2. The optical disk device according to claim 1 wherein said signal process means comprises an automatic gain control circuit for controlling an amplitude of a regenerated signal to be constant, so that response characteristics of said automatic gain control circuit are controlled according to the oscillation frequency of said voltage/current control oscillator.

3. The optical disk device according to claim 1 wherein said signal process means comprises a waveform equalization circuit for removing a regenerated signal out-of-band element and equalizing a waveform, so that a signal removal band and waveform equalization characteristics of said waveform equalization circuit are varied according to the oscillation frequency of said voltage/current control oscillator.

4. The optical disk device according to claim 1 wherein said signal process means comprises a binarization circuit for converting a regenerated signal into binary data, so that response characteristics of said binarization circuit are varied according to the oscillation frequency of said binary data circuit.

5. The optical disk device according to claim 1 wherein said signal process means comprises a mono-multi vibrator for generating a one-shot pulse having a predetermined width from an edge of a binary signal output by a binarization circuit, so that the pulse width of the one-shot pulse is controlled according to the oscillation frequency of said voltage/current control oscillator.

6. An optical disk device comprising:
 optical means for extracting information stored on a disk;
 control means for controlling said optical means;
 signal process means for optimally converting a regenerated signal extracted by said optical means into a binary signal;
 reference clock generation means for generating a reference clock substantially equal to a basic transfer speed of the regenerated signal from a fixed clock; and
 data clock extraction means for extracting a clock element from binary data of the regenerated signal;
 said reference clock generation means comprising:
  a first divider for dividing the fixed clock;
  a second divider for dividing the reference clock;

a first phase comparator for detecting a phase error between a division clock output by said first divider and a division clock output by said second divider;

a first voltage/current control oscillator oscillating at a frequency depending on the phase error output by said first phase comparator; and central frequency setting means for setting a central oscillation frequency of said first voltage/current control oscillator;

said data clock extraction means comprising:

a second phase comparator for detecting a phase error between the regenerated binary data and a data clock; and a second voltage/current control oscillator oscillating at a frequency depending on the phase error output by said second phase comparator;

whereby characteristics of said first voltage/current control oscillator are set equal or similar to the characteristics of said second voltage/current control oscillator, and the oscillation frequency of said first voltage/current control oscillator is referred to by said second voltage/current control oscillator.

7. An optical disk device comprising:

optical means for extracting information stored on a disk;

control means for controlling said optical means;

signal process means for optimally converting a regenerated signal extracted by said optical means into a binary signal;

reference clock generation means for generating a reference clock substantially equal to a basic transfer speed of the regenerated signal from a fixed clock; and data clock extraction means for extracting a clock element from binary data of the regenerated signal;

said reference clock generation means comprising:

a first divider for dividing the fixed clock;

a second divider for dividing the reference clock;

a phase comparator for detecting a phase error between a division clock output by said first divider and a division clock output by said second divider;

a first voltage/current control oscillator oscillation at a frequency depending on the phase error output by said phase comparator; and setting means for setting a central oscillation frequency or a gain of said first voltage/current control oscillator;

said data clock extraction means comprising:

a second voltage/current control oscillator having at least characteristics equal to characteristics of said first voltage/current control oscillator; and synchronization detection means for detecting a synchronization state of said data clock extraction means;

whereby characteristics of said signal process means can be optimally varied based on a detection state of said synchronization detection means.

8. The optical disk device according to claim 7 wherein said signal process means comprises an automatic gain control circuit for controlling an amplitude of the regenerated signal to be constant, so that response characteristics of said automatic gain control circuit are controlled according to an oscillation frequency of said first voltage/current control oscillator.

9. The optical disk device according to claim 7 wherein said signal process means comprises a waveform equalization circuit for removing the regenerated signal out-of-band element and equalizing a waveform, so that a signal removal band and waveform equalization characteristics of said waveform equalization circuit are varied according to an oscillation frequency of the first voltage/current control oscillator in said reference clock generation means or of the second voltage/current control oscillator in said data clock extraction means.

10. The optical disk device according to claim 7 wherein said signal process means comprises a binarization circuit for converting a regenerated signal into binary data, so that response characteristics of said binarization circuit is varied according to an oscillation frequency of the first voltage/current control oscillator in said reference clock generation means or of the second voltage/current control oscillator in said data clock extraction means.

11. The optical disk device according to claim 7 wherein said signal process means comprises a mono-multi vibrator for generating a one-shot pulse having a predetermined width from an edge of a binary signal output by the binarization circuit, so that a pulse width of said one-shot pulse is controlled according to an oscillation frequency of the first voltage/current control oscillator in said reference clock generation means or of the second voltage/current control oscillator in said data clock extraction means.

12. An optical disk device comprising:

reference clock generation means for generating a reference clock substantially equal to a basic transfer speed of the regenerated signal from a predetermined fixed clock;

said reference clock generation means comprising:

a first divider for dividing the fixed clock;

a second divider for dividing the reference clock;

a phase comparator for detecting a phase error between a division clock output by said first divider and a division clock output by said second divider;

a charge pump for converting the phase error detected by said phase comparator into a voltage or an amount of electric current; and a voltage/current control oscillator for oscillation at a frequency depending on the phase error output by said phase comparator;

whereby a gain of said reference clock generation means is varied based on an amount of division of said first divider.

13. The optical disk device according to claim 12 wherein the gain of said reference clock generation means is varied based on an amount of voltage or electric current of said charge pump.

* * * * *